United States Patent Office 2,856,350
Patented Oct. 14, 1958

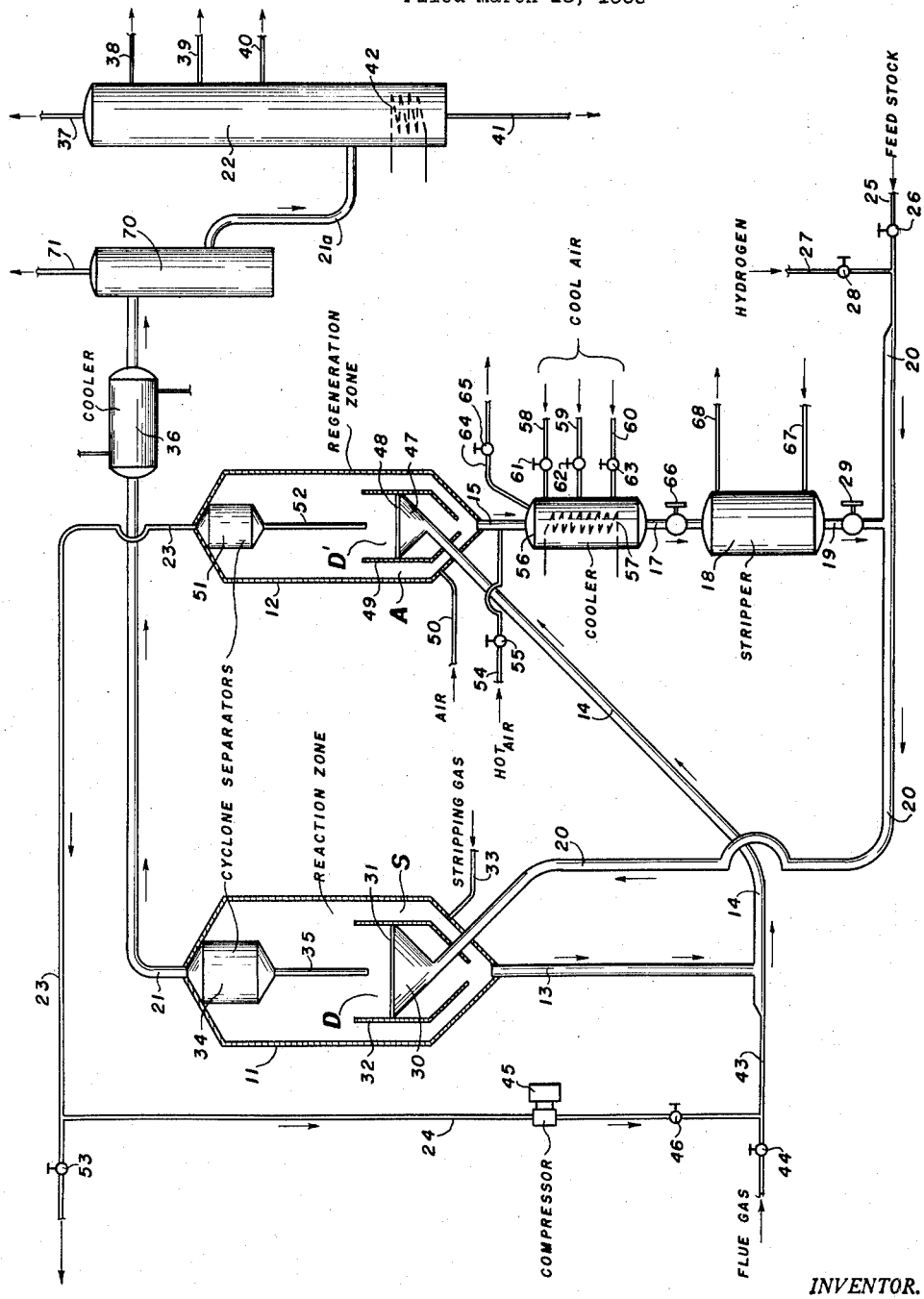

2,856,350

RECONDITIONING OF PLATINUM CATALYST

Robert M. Love, Baytown, Tex., assignor, by mesne assignments, to Esso Research and Engineering Company, Elizabeth, N. J., a corporation of Delaware Application March 18, 1953, Serial No. 343,199

9 Claims. (Cl. 208—140)

The present invention is directed to the reconditioning of a platinum hydroforming catalyst. More particularly, the invention is directed to the maintenance of activity of a platinum on alumina hydroforming catalyst. In its more specific aspects, the invention is directed to the fluidized hydroforming of naphthenic hydrocarbons employing a platinum catalyst.

The present invention may be briefly described as an improvement in a fluidized hydroforming operation in which a supported platinum catalyst such as platinum on alumina catalyst is employed. In such operations, a naphthenic hydrocarbon boiling in the range between 150° and 500° F. is contacted in admixture with hydrogen with a platinum on alumina catalyst which is suspended in the vaporized hydrocarbon-hydrogen mixture. During the hydroforming operation, the catalyst becomes fouled with carbonaceous deposits which must be removed in a combustion operation in a regeneration zone. Thereafter the regenerated catalyst is again contacted with the hydrocarbon in the presence of hydrogen. In such a process, there is a normal temperature drop of the regenerated catalyst after regeneration and before it is again contacted with hydrogen and hydrocarbon of less than approximately 10° F. My particular invention resides in cooling the regenerated catalyst in the presence of free oxygen in an amount equivalent to at least one atmosphere partial pressure to a temperature in the range between approximately 800° and approximately 900° F. before the regenerated catalyst is contacted with the hydrogen. By cooling the catalyst directly in the presence of free oxygen an amount sufficient to lower the temperature by approximately 150° to 300° F. before the regenerated catalyst is again contacted with hydrogen, it is possible to restore and maintain the original catalyst activity.

In the practice of the present invention, the hydroforming operation is conducted at a temperature in the range from about 900° to 1000° F. Desirable results are obtained at about 950° F. The regeneration operation is conducted at a temperature which may be in the range from 900° to 1100° F. but preferably from 1050° to 1100° F. in a combustion operation in which non-volatile carbonaceous deposits and carbon are removed from the catalyst by burning in the presence of free oxygen. The pressure employed in the fluidized operation preferably ranges from about 200 to about 400 p. s. i. g., but pressures as low as 50 p. s. i. g. and as high as 700 p. s. i. g. may be used.

The amount of hydrogen employed will range from about 1000 cubic feet to about 10,000 cubic feet per barrel of feed. The preferred operation will employ about 5000 cubic feet of hydrogen per barrel of feed. While pure hydrogen may be used ordinarily, I would preferably employ a free hydrogen-containing gas.

Likewise, while I may employ air as the free oxygen-containing gas, I may suitably use other gases, such as flue gas, which has been diluted with air or free oxygen.

The hydrocarbon employed as the feed stock of my invention is a naphthenic hydrocarbon boiling in the range from about 150° to about 500° F. Such naphthenic hydrocarbons may be obtained from crude petroleums, such as the Coastal crude oils, the California type crudes and particularly those from naphthenic base crude petroleum. I may also employ as a feed stock, either alone or in admixture with the crude petroleum fractions, the naphthenic fractions boiling in the range from 150° to 500° F. obtained in catalytic conversion operations, such as catalytic cracking operations. It is preferred, however, to employ the crude petroleum fractions.

The feed stock to the present invention will ordinarily be charged to the process at a liquid space velocity in a range from about 1 to about 4 liquid volumes of feed per volume of catalyst per hour. A space velocity of 2 v./v./hr. gives very desirable results when charging a hydrocarbon fraction from a Coastal crude.

The catalyst employed in the practice of the present invention preferably will be a platinum on alumina catalyst containing from about 0.1% to 3.0% by weight platinum, preferably 0.2% to 1.0% by weight. It is desirable that the alumina on which the platinum is deposited be a purified alumina such as a gamma alumina derived from boehmite. Although gamma alumina or purified alumina is preferred, I may use a platinum on alumina catalyst derived from other sources. There are numerous aluminas on the market which are available as supports for catalysts, and I intend that I may use a platinum on alumina catalyst of the type available. I also intend that other supported platinum catalysts may be used such as platinum on zirconia, magnesia and magnesia-alumina mixtures, and the like.

In the fluidized operation of my invention, the catalyst should have a particle diameter in the range from about 0 to 100 microns with a major portion of the catalyst having particle diameters in the range from about 20 to about 80 microns. It is necessary that a major portion of the catalyst have particle diameters in the range from about 20 to about 80 microns to allow the catalyst to be readily fluidized or suspended in the vaporous hydrocarbon-hydrogen mixture.

In the practice of the present invention, the cooled catalyst may be contacted with hydrogen or with a mixture of hydrogen and hydrocarbon. It may be desirable, for example, to contact the cooled catalyst with hydrogen and then bring the temperature of the hydrogen and catalyst mixture up to reaction temperature before the hydrocarbon is admixed therewith. Desirable results, however, are obtained by admixing the cooled catalyst with hydrogen and hydrocarbon and bringing the suspension of the catalyst in the hydrocarbon-hydrogen mixture up to reaction temperature.

The invention will be further illustrated by reference to the drawing in which the single figure is a flow sheet of a preferred mode of practicing the invention.

Referring now to the drawing, numeral 11 designates a reaction zone and numeral 12 designates a regeneration zone of a fluid hydroforming system. Reaction zone 11 is provided with a downwardly extending pipe 13 which is connected to the regeneration zone 12 by a transverse conduit 14. The regeneration zone 12 is connected by a downwardly extending pipe 15 to a cooling zone 56 which, in turn, is connected by a pipe 17 to a stripping zone 18. The stripping zone 18 is provided with a pipe 19 which connects with a transverse conduit 20 which leads into reaction zone 11.

The reaction zone 11 is provided with a conduit 21 for withdrawal of products which leads into gas separator 70 and thence by line 21a into a fractionation zone 22 which serves to separate the products into desired fractions. The regeneration zone 12 has a conduit 23 which leads off combustion products from the system or recycles them by way of branch line 24 to the regeneration zone 12 as will be described.

In the foregoing operation, it may be assumed that catalyst is circulating from reaction zone 11 to regeneration zone 12 and from regeneration zone 12 to reaction zone 11. In this operation, feed hydrocarbon is introduced into the system by line 25 controlled by valve 26 by way of which a feed hydrocarbon, such as a naphthenic hydrocarbon from a Coastal crude, is introduced from a source not shown. Leading into line 25 is line 27 controlled by valve 28 which connects into a source of hydrogen such as a free hydrogen-containing gas. The admixture of hydrogen and feed stock which is at an elevated temperature in the range from 900° to 1050° F. is introduced into conduit 20 and is admixed with regenerated catalyst from line 19 controlled by valve 29. This catalyst is at a temperature in the range from about 800° to about 900° F. The suspension of regenerated catalyst in vaporized hydrocarbon and hydrogen is then introduced by way of conduit 20 into reaction zone 11 through the funnel-shaped member 30 which is provided with a grid plate 31 above which a dense phase is maintained. The reaction zone 11 is provided with an annular wall 32 which defines with the interior wall of the vessel 11 a stripping zone indicated generally by the letter S, into which stripping gas is introduced by way of line 33. This stripping gas may suitably be a free hydrogen-containing gas, and it is desired to remove hydrocarbons and volatile carbonaceous materials from the catalyst.

The reaction zone 11 is provided with a separation means 34 which may be a cyclone separator. Separation means 34 is provided with a dip leg 35 which serves to return catalyst separated from the reaction products back into the dense phase generally indicated by the letter D. The reaction products are withdrawn from reactor zone 11 and separator 34 by way of conduit 21 which contains a cooler or condenser 36 which reduces the temperature of the reaction products flowing into gas separator 70 to permit separation of non-condensible gas therefrom by line 71. The gas withdrawn by line 71 is a hydrogen-containing gas and may be discarded but preferably recycled to line 27. Liquid products from separator 70 then flow by line 21a into distillation zone 22. Distillation zone 22 may be a plurality of distillation towers equipped with means for inducing reflux and suitable vapor-liquid contact means. The product is separated into the desired fractions, such that a light fraction may be removed by line 37 and increasingly heavier fractions by lines 38, 39 and 40, as desired, with bottoms being withdrawn by line 41. The distillation zone 22 is provided with a heating means illustrated by steam coil 42 for adjustments of temperature and pressure.

The catalyst during the reaction operation in zone 11 becomes fouled with non-volatile carbonaceous material and carbon and this material interferes with the activity of the catalyst and must be removed. With this end in view, the catalyst is withdrawn by conduit 13 into conduit 14, and it is suspended in flue gas which may be introduced by line 43 from a source not shown by opening valve 44 but preferably is obtained from the regeneration zone 12 by way of lines 23 and 24. Line 24 is provided with a compressor 45 to raise the pressure of the flue gas to transport the fouled catalyst to zone 12 on opening valve 46.

Regeneration zone 12 is, like zone 11, provided with a funnel-shaped member 47 on which is arranged a grid plate 48 above which is maintained a dense phase indicated generally by D'. The regeneration zone 12 may be provided with an annular member 49 which defines an annulus A with the interior wall of the vessel 12. Into this annulus is introduced by way of line 50 a free oxygen-containing gas which may be flue gas diluted with air or which may be air with its oxygen content fortified with free oxygen. The annular member 49 may be omitted if desired and the air introduced directly into zone 12. In any event, in zone 12 a combustion operation is maintained to remove the carbonaceous deposits from the catalyst.

The upper section of the zone 12 is provided with a separating means, such as a cyclone separator 51, which serves to remove catalyst fines from the combustion products and to return the catalyst to the dense phase D' by dip leg 52.

The flue gas combustion products are removed from zone 12 and separator 51 by line 23 and either are recycled by way of line 24 to line 43 and conduit 14 or withdrawn from the system by opening valve 53 in line 23.

The catalyst, after the burning operation, is removed from the regeneration zone 12 by conduit 15 and is contacted therein with a gas having an oxygen concentration such that the partial pressure of oxygen is at least one atmosphere at a temperature in the range of 1050° to 1100° F., which is introduced by line 54 controlled by valve 55. Thus, the hot air may serve to heat the catalyst in line 15 if the regeneration operation is conducted at a temperature below the temperature of the hot air. Thereafter the catalyst is introduced into a cooling zone 56, which is provided with an auxiliary internal cooling coil 57 through which a cooling medium may be circulated. However, in the practice of my invention, I cool the catalyst in zone 56 to a temperature in the range between 800° and 900° F. in the presence of free oxygen-containing gas, preferably by introducing cooled air by way of lines 58, 59 and 60 controlled, respectively, by valves 61, 62 and 63. By cooling the regenerated catalyst by direct contact with cooled free oxygen-containing gas, such as air, I am able to maintain the catalyst activity and to restore the activity when it is depleted due to the operation in zone 11. In my invention, I conduct the cooling operation such that the temperature of the catalyst is reduced by approximately 150° to 300° F. in contact with free oxygen before the catalyst is again contacted with hydrogen. Provision is made to remove air from vessel 56 by way of line 64 controlled by valve 65. Ordinarily, however, the air introduced into vessel 56 will proceed up conduit 15 into vessel 12 countercurrent to the flow of the descending catalyst. After the catalyst has been cooled in vessel 56 by direct contact with free oxygen-containing gas, it is then introduced by way of conduit 17 controlled by valve 66 into stripping vessel 18 into which is introduced by way of line 67 a stripping gas such as flue gas which may be obtained elsewhere in the operation. The flue gas removes the free oxygen from the catalyst by way of line 68. The catalyst then at a temperature in the range between 800° to about 900° F. is allowed to flow by conduit 19 controlled by valve 29 into conduit 20, as has been described.

It is important in the present invention that the amount of free oxygen in contact with the catalyst after regeneration during the heating and cooling operation be sufficient to provide a partial pressure of free oxygen of at least one atmosphere. To illustrate the amounts of oxygen present in the free oxygen-containing gas employed for heating and cooling the catalyst directly after regeneration, the following table of data is given for various operating pressures:

*Table*

| Operating Pressures, p. s. i. g. | Percent Oxygen in Oxygen-Containing Gas |
|---|---|
| 50 | 22.7 |
| 100 | 12.8 |
| 200 | 6.8 |
| 300 | 4.7 |
| 400 | 3.5 |
| 500 | 2.9 |
| 600 | 2.4 |

It will be seen from these data that operating at a pressure in the range from 200 to 400 p. s. i. g., I may use a free oxygen-containing gas containing from about 3½% to 7% by volume of free oxygen or more.

By the mode of operation, as has been described in detail in conjunction with the drawing, I am able to maintain and restore the activity of platinum on alumina hydroforming catalyst. Such operations are quite useful and necessary since platinum on alumina, while being a very effective hydroforming catalyst, is quite expensive, and it is necessary to restore and maintain the activity of the catalyst for economic reasons. A mode such as I have described allows the obtaining of a hydroformed product having a consistently high octane number at a high yield of liquid product. This makes my invention especially useful in view of the constant increase in demand for high octane fuels.

Although I have mentioned flue gas for use in stripping oxygen from the cooled catalyst, it is understood that other oxygen-free inert gases such as nitrogen, carbon dioxide, mixtures thereof, and the like, may be used.

While the invention has been described with respect to the drawing as treating the total regenerated catalyst before recycling same to the reactor, it is within the purview of my invention to treat the regenerated catalyst in accordance with my invention, only intermittently or to treat during each cycle only a portion of the regenerated catalyst. Thus, I may wish to treat the regenerated catalyst with hot and cool free oxygen-containing gas after several reaction and regeneration cycles or by-pass a portion of the regenerated catalyst to the reaction zone and treat that portion not by-passed around vessels 56 and 57.

The nature and objects of the present invention having been completely described and illustrated, what I wish to claim as new and useful and to secure by Letters Patent is:

1. In a fluidized hydroforming operation in which a supported platinum catalyst is contacted at a temperature in the range between 900° and 1000° F. in a reaction zone with a naphthenic hydrocarbon feed stock in the presence of hydrogen to hydroform said hydrocarbon and in which the catalyst becomes fouled with carbonaceous deposits and is regenerated at a temperature in the range between 1050° and 1100° F. in a regeneration zone in the presence of a free oxygen-containing gas in a combustion operation to remove said carbonaceous deposits and the regenerated catalyst is again contacted with said hydrocarbon in the presence of hydrogen wherein the normal temperature drop of said regenerated catalyst after regeneration is less than approximately 10° F., the step of cooling at least a portion of said regenerated catalyst with oxygen subsequent to regeneration by about 150° to 300° F. in the presence of at least one atmosphere partial pressure of free oxygen to a temperature in the range between approximately 800° and approximately 900° F. before said regenerated catalyst is contacted with hydrogen.

2. In a fluidized hydroforming operation in which a platinum on alumina catalyst is contacted at a temperature in the range between 900° and 1000° F. in a reaction zone with a naphthenic hydrocarbon feed stock in the presence of hydrogen to hydroform said hydrocarbon and in which the catalyst becomes fouled with carbonaceous deposits and is regenerated at a temperature in the range between 1050° and 1100° F. in a regeneration zone in the presence of a free oxygen-containing gas in a combustion operation to remove carbonaceous deposits and the regenerated catalyst is again contacted with said hydrocarbon in the presence of hydrogen wherein the normal temperature drop of said regenerated catalyst after regeneration is less than approximately 10° F., the step of cooling at least a portion of said regenerated catalyst with oxygen subsequent to regeneration in the presence of free oxygen-containing gas an amount sufficient to lower the temperature of said regenerated catalyst at least approximately 150° F. and to provide a partial pressure of free oxygen of at least one atmosphere during the cooling step before the regenerated catalyst is again contacted with hydrogen.

3. A method in accordance with claim 2 in which the naphthenic hydrocarbon boils in the range between 150° and 500° F.

4. A method for hydroforming a naphthenic hydrocarbon boiling in the range between 150° and 500° F. which comprises suspending a platinum on alumina catalyst in a vaporized mixture of said naphthenic hydrocarbon and hydrogen, contacting said suspension in a reaction zone at a temperature in the range between 900° and 1000° F. under hydroforming conditions to hydroform said naphthenic hydrocarbon in which said platinum on alumina catalyst becomes fouled with carbonaceous deposits, separating fouled platinum on alumina catalyst from vaporous reaction products formed in said hydroforming operation, regenerating said fouled catalyst containing carbonaceous deposits in a regeneration zone at a temperature in the range between 1050° and 1100° F. in the presence of a sufficient amount of a free oxygen-containing gas to support a combustion operation to remove carbonaceous deposits from said catalyst, removing products of said combustion operation from said catalyst, maintaining a free oxygen-containing gas in contact with said regenerated catalyst, cooling said catalyst with cool free oxygen-containing gas in an amount sufficient to lower the temperature of said catalyst by about 150° to about 300° F., the free oxygen content of said gas being sufficient to provide a partial pressure of oxygen of at least one atmosphere during said cooling operation, removing said free oxygen-containing gas from said cooled catalyst and then contacting said cooled catalyst with hydrogen.

5. A method for hydroforming a naphthenic hydrocarbon boiling in the range between 150° and 500° F. which comprises suspending a platinum on alumina catalyst in a vaporized mixture of said naphthenic hydrocarbon and hydrogen, contacting said suspension in a reaction zone at a temperature in the range between 900° and 1000° F. under hydroforming conditions to hydroform said naphthenic hydrocarbon in which said platinum on alumina catalyst becomes fouled with carbonaceous deposits, separating fouled platinum on alumina catalyst from vaporous reaction products formed in said hydroforming operation, regenerating said fouled catalyst containing carbonaceous deposits in a regeneration zone at a temperature in the range between 1050° and 1100° F. in the presence of a sufficient amount of a free oxygen-containing gas to support a combustion operation to remove carbonaceous deposits from said catalyst, removing products of said combustion operation from said catalyst, removing regenerated catalyst from said regeneration zone, maintaining a free oxygen-containing gas in contact with said regenerated catalyst, cooling said catalyst by about 150° to 300° F. with cool, free oxygen-containing gas an amount sufficient to lower the temperature of said catalyst to a temperature in the range between 300° and 900° F., the free oxygen content of said gas being sufficient to provide a partial pressure of oxygen of at least one atmosphere during said cooling operation, removing said free oxygen-containing gas from said cooled catalyst, and then contacting said cooled catalyst with hydrogen.

6. A method for hydroforming a naphthenic hydrocarbon boiling in the range between 150° and 500° F. which comprises suspending a platinum on alumina catalyst in a vaporized mixture of said naphthenic hydrocarbon and hydrogen, contacting said suspension in a reaction zone at a temperature in the range between 900° and 1000° F. under hydroforming conditions to hydroform said naphthenic hydrocarbon in which said platinum on alumina catalyst becomes fouled with carbonaceous deposits, separating fouled platinum on alumina catalyst from vaporous reaction products formed in said hydroforming operation, regenerating said catalyst containing carbonaceous deposits in a regeneration zone at a temperature in the range between 900° and 1100° F. in the presence of a free oxygen-containing gas to support a combustion operation to remove carbonaceous deposits from said catalyst, removing products of said combustion operation from said catalyst, removing regenerated catalyst from said regeneration zone, contacting at least a portion of said regenerated catalyst with hot, free oxygen-containing gas at a temperature in the range between 1050° and 1100° F., cooling said catalyst by about 150° to 300° F. with cool, free oxygen-containing gas an amount sufficient to lower the temperature of said catalyst to a temperature in the range between 800° and 900° F., the free oxygen content of said hot and cool free oxygen-containing gases being sufficient to provide a partial pressure of oxygen of at least one atmosphere, stripping said cooled catalyst with flue gas to remove said cool, free oxygen-containing gas from said cooled catalyst, and then contacting said cooled catalyst with hydrogen.

7. A method for hydroforming a naphthenic hydrocarbon boiling in the range of 150° and 500° F. which comprises suspending a platinum-on-alumina catalyst in a vaporized mixture of naphthenic hydrocarbon and hydrogen, contacting said suspension in a reaction zone under conversion conditions including a temperature in the range between 950° and 1000° F., a pressure within the range of about 200 to 400 p. s. i. g., a hydrogen charge rate within the range of about 1000 to 10,000 cubic feet of hydrogen per barrel of naphthenic hydrocarbon and a space velocity within the range of about 1 to 4 volumes of feed per volume of catalyst per hour, whereby said catalyst becomes fouled with carbonaceous deposits, separating fouled platinum-on-alumina catalyst from vaporous reaction products formed in said hydroforming reaction, regenerating said fouled catalyst in a regeneration zone at a temperature in the range between 900° and 1100° F. in the presence of an amount of a free oxygen-containing gas sufficient to support a combustion operation to regenerate said fouled catalyst, removing products of said combustion operation from said regenerated catalyst, cooling said regenerated catalyst by about 150° to 300° F. with an amount of gaseous medium containing from about 3½ to 7 volume percent of free oxygen sufficient to lower the temperature of said catalyst to a temperature in the range between about 800° and 900° F., stripping said cooled catalyst with flue gas to remove said cool, free oxygen-containing gas from said cooled catalyst, next contacting said cooled catalyst with hydrogen and then again suspending said catalyst in said mixture of naphthenic hydrocarbon and hydrogen.

8. A method as in claim 7 wherein the hydroforming reaction is conducted at a temperature of about 950° F. and wherein the regeneration is conducted at a temperature within the range of about 1050° to 1100° F.

9. A process as in claim 7 wherein said regenerated catalyst is cooled by about 150° to 300° F. in a cooling zone exterior to said reaction zone and said regeneration zone.

References Cited in the file of this patent

UNITED STATES PATENTS

| | | |
|---|---|---|
| 2,366,372 | Voorhees | Jan. 2, 1945 |
| 2,472,844 | Munday et al. | June 14, 1949 |
| 2,479,110 | Haensel | Aug. 16, 1949 |
| 2,533,666 | Gunness | Dec. 12, 1950 |
| 2,662,861 | Riblett et al. | Dec. 15, 1953 |
| 2,664,404 | Blatz et al. | Dec. 29, 1953 |
| 2,689,823 | Hardy et al. | Sept. 21, 1954 |
| 2,749,287 | Kirshenbaum | June 5, 1956 |
| 2,762,752 | Hemminger | Sept. 11, 1956 |